US 8,295,868 B2

(12) United States Patent
Zhang et al.

(10) Patent No.: US 8,295,868 B2
(45) Date of Patent: Oct. 23, 2012

(54) DOWNLINK CONTROL INFORMATION FORMAT FOR MULTIPLE CODEWORD TRANSMISSION

(75) Inventors: Jianzhong Zhang, Irving, TX (US); Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 645 days.

(21) Appl. No.: 12/386,773

(22) Filed: Apr. 22, 2009

(65) Prior Publication Data

US 2009/0305698 A1   Dec. 10, 2009

Related U.S. Application Data

(60) Provisional application No. 61/131,422, filed on Jun. 9, 2008.

(51) Int. Cl.
*H04B 15/00*  (2006.01)

(52) U.S. Cl. .......... 455/515; 455/434; 455/511; 455/60; 379/300; 379/476

(58) Field of Classification Search .................. 455/434, 455/511, 515, 68; 370/300, 476, 99; 379/63
See application file for complete search history.

(56) References Cited

U.S. PATENT DOCUMENTS

| | | | |
|---|---|---|---|
| 7,064,691 B2 * | 6/2006 | Takeuchi et al. | 341/102 |
| 2006/0171307 A1 * | 8/2006 | Gopalakrishnan et al. | 370/229 |
| 2007/0113138 A1 * | 5/2007 | Kwon et al. | 714/748 |
| 2008/0049709 A1 * | 2/2008 | Pan et al. | 370/344 |
| 2008/0095258 A1 * | 4/2008 | She et al. | 375/262 |
| 2008/0212543 A1 * | 9/2008 | Ban | 370/336 |
| 2008/0284472 A1 * | 11/2008 | Han et al. | 327/113 |
| 2009/0176463 A1 * | 7/2009 | Raaf et al. | 455/101 |
| 2009/0197630 A1 * | 8/2009 | Ahn et al. | 455/522 |
| 2009/0241004 A1 * | 9/2009 | Ahn et al. | 714/749 |
| 2009/0268693 A1 * | 10/2009 | Lindh et al. | 370/336 |
| 2009/0274077 A1 * | 11/2009 | Meylan et al. | 370/280 |
| 2009/0303951 A1 * | 12/2009 | Lunttila et al. | 370/329 |

* cited by examiner

*Primary Examiner* — Kamran Afshar
*Assistant Examiner* — Marisol Fahnert

(57) ABSTRACT

Systems and methods are disclosed that relate to a wireless communication system. Theses systems and methods include providing information from a base station to a mobile device than enables the mobile device to use at least one DCI format. In some embodiments, this information is provided by receiving data over a wireless communication channel. The transmitted data comprises identification information that identifies the format of the transmitted data being transmitted. These systems and methods may also include identifying the format of the transmitted data and processing the transmitted data using the identified format of the transmitted data.

20 Claims, 6 Drawing Sheets

DOWNLINK CONTROL INFORMATION FORMAT FOR MULTIPLE CODEWORD TRANSMISSION

CROSS-REFERENCE TO RELATED APPLICATION(S) AND CLAIM OF PRIORITY

The present application is related to U.S. Provisional Patent No. 61/131,422, filed Jun. 9, 2008, entitled "DOWNLINK CONTROL INFORMATION FORMAT FOR MULTIPLE CODEWORD TRANSMISSION". Provisional Patent No. 61/131,422 is assigned to the assignee of the present application and is hereby incorporated by reference into the present application as if fully set forth herein. The present application hereby claims priority under 35 U.S.C. §119(e) to U.S. Provisional Patent No. 61/131,422.

TECHNICAL FIELD OF THE INVENTION

The present application relates generally to wireless networks and, more specifically, to systems and methods for dynamically switching between data formats.

BACKGROUND OF THE INVENTION

In document R1-082254, "TS36.213 CR 19 Rev1 v8.2.0", May 2008, a number of features were agreed upon regarding the transmission mode and DCI (downlink control information) for the 3GPP LTE system. Among other things, it was agreed that a mobile device shall receive Physical Downlink Shared Channel (PDSCH) broadcast control transmissions, namely paging, Random Access CHannel (RACH) Response, and Broadcast Control CHannel (BCCH) associated with DCI formats 1A or 1C signaled by a Physical Downlink Control Channel (PDCCH) in the common search spaces. Additionally, the mobile device is semi-statically configured via higher layer signaling to receive PDSCH data transmissions signaled via PDCCH mobile device specific search spaces based on one of the following transmission modes: 1) single-antenna port (port 0); 2) transmit diversity; 3) open-loop spatial-multiplexing; 4) closed-loop spatial multiplexing; 5) multi-user MIMO; 6) closed-loop rank=1 preceding; 7) single-antenna port (port 5).

A mobile device or user equipment (UE) not configured to receive PDSCH data transmissions based on one of the transmission modes may receive PDSCH data transmissions with DCI format 1A signaled by a PDCCH in its mobile station specific search spaces or the common search spaces.

A mobile device semi-statically configured with a transmission mode shall receive PDSCH data transmissions associated with a reference DCI format signaled by a PDCCH in its mobile device specific search spaces based on Table 1. In the case of transmission modes 1, 2, and 7, a UE shall receive PDSCH data transmissions associated with reference DCI formats 1 or 1A in its UE specific search spaces or DCI format 1A in the common search spaces. A UE with reference DCI format 1B or 2 also may also receive PDSCH data transmissions associated with DCI format 1A signaled by a PDCCH in its UE specific search spaces or the common search spaces. A UE shall be configured to use the PUCCH or PUSCH feedback mode corresponding to its reference DCI format.

A table of the transmission mode that is supported by reference DCI formats is shown in Table 1 below:

TABLE 1

| Reference DCI Format supported by transmission mode | |
| --- | --- |
| Transmission Mode | Reference DCI Format |
| 1 | 1, 1A |
| 2 | 1, 1A |
| 3 | 2 |
| 4 | 2 |
| 5 | TBD |
| 6 | 1B |
| 7 | 1, 1A |

Therefore, there is a need in the art for an improved data format switching between DCI formats.

SUMMARY OF THE INVENTION

In one embodiment, a method is disclosed that relates to a wireless communication system. This method includes providing information from a base station to a mobile device than enables the mobile device to use at least one DCI format. In some embodiments, this information is provided by receiving data over a wireless communication channel. The transmitted data comprises identification information that identifies the format of the transmitted data being transmitted. This method may also include identifying the format of the transmitted data and processing the transmitted data using the identified format of the transmitted data.

In another embodiment, a system is disclosed that includes a receiver that obtains wireless information through a wireless communication channel. This system may also include a processor that obtains the wireless information from the receiver and interprets the wireless data format using identification information comprised within the wireless information.

In yet another embodiment, a method for allowing a mobile device configured to communication using DCI format 2 to communication with a base station configured to communication using DCI format 1A is disclosed. In this embodiment, the method includes selecting data to be transmitted from the base station to the mobile device, embedding information into the data that indicates the type of format to be used by the mobile device and transmitting the data to the mobile device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
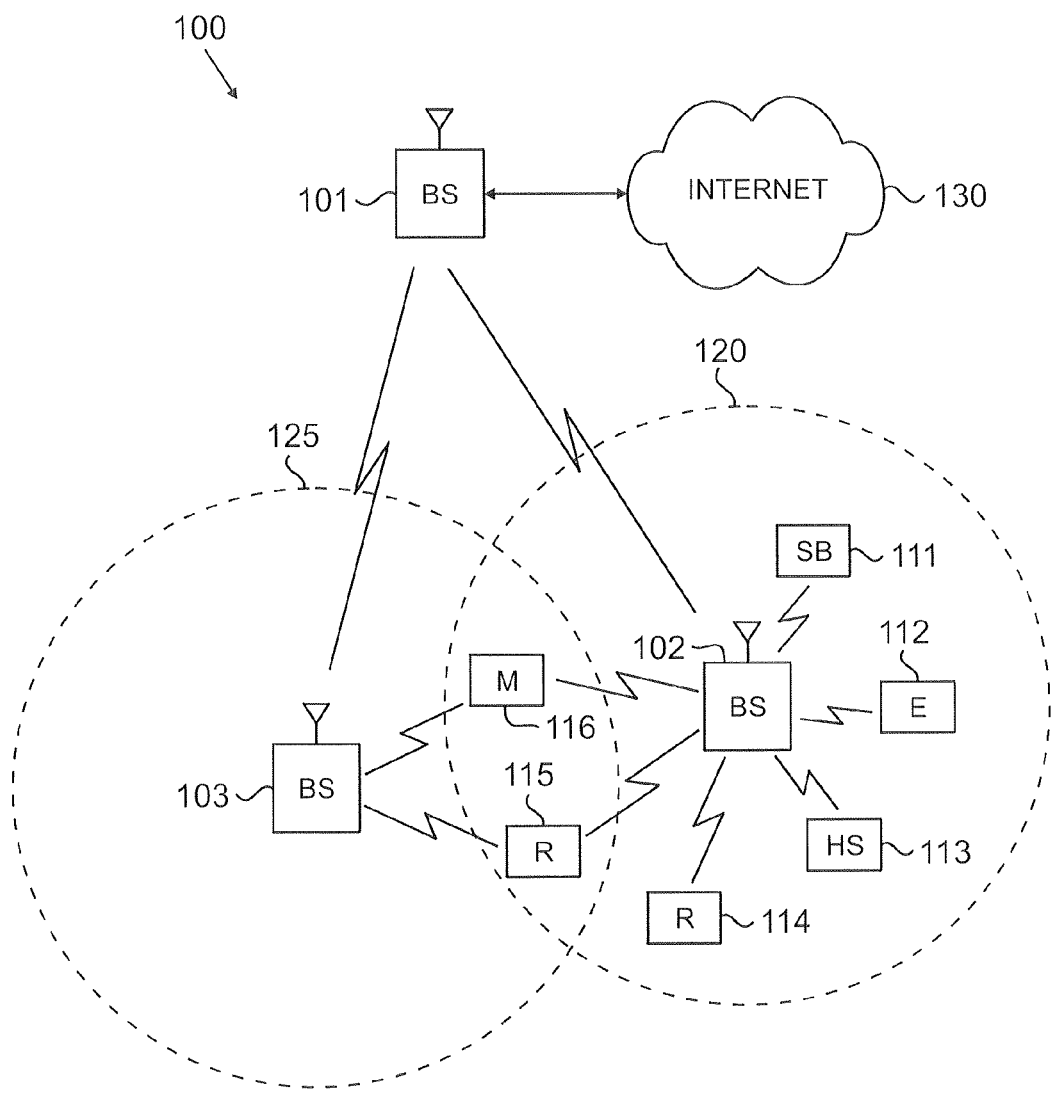
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of mobile stations within coverage area 120 of base station 102. The first plurality of mobile stations includes mobile station 111, which may be located in a small business (SB), mobile station 112, which may be located in an enterprise (E), mobile station 113, which may be located in a WiFi hotspot (HS), mobile station 114, which may be located in a first residence (R), mobile station 115, which may be located in a second residence (R), and mobile station 116, which may be a mobile device (M), such as a cell phone, a wireless laptop, a wireless PDA, or the like.

Base station 103 provides wireless broadband access (via base station 101) to Internet 130 to a second plurality of mobile stations within coverage area 125 of base station 103. The second plurality of mobile stations includes mobile station 115 and mobile station 116. In an exemplary embodiment, base stations 101-103 may communicate with each other and with mobile stations 111-116 using OFDM or OFDMA techniques.

Base station 101 may be in communication with either a greater number or a lesser number of base stations. Furthermore, while only six mobile stations are depicted in FIG. 1, it is understood that wireless network 100 may provide wireless broadband access to additional mobile stations. It is noted that mobile station 115 and mobile station 116 are located on the edges of both coverage area 120 and coverage area 125. Mobile station 115 and mobile station 116 each communicate with both base station 102 and base station 103 and may be said to be operating in handoff mode, as known to those of skill in the art.

Mobile stations 111-116 may access voice, data, video, video conferencing, and/or other broadband services via Internet 130. In an exemplary embodiment, one or more of mobile stations 111-116 may be associated with an access point (AP) of a WiFi WLAN. Mobile station 116 may be any of a number of mobile devices, including a wireless-enabled laptop computer, personal data assistant, notebook, handheld device, or other wireless-enabled device. Mobile stations 114 and 115 may be, for example, a wireless-enabled personal computer (PC), a laptop computer, a gateway, or another device.

Figure 2A:
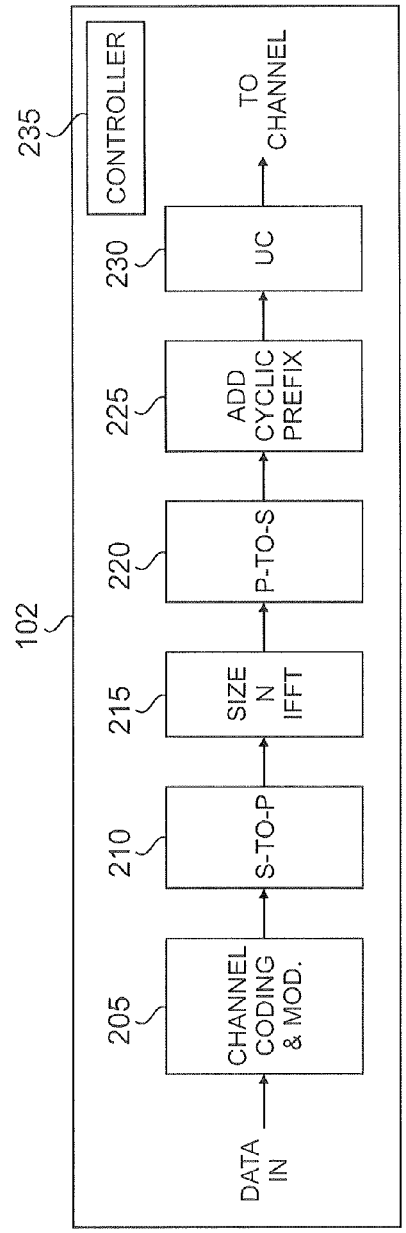
FIG. 2A is a high-level diagram of an orthogonal frequency division multiple access (OFDMA) transmit path.
Figure 2B:
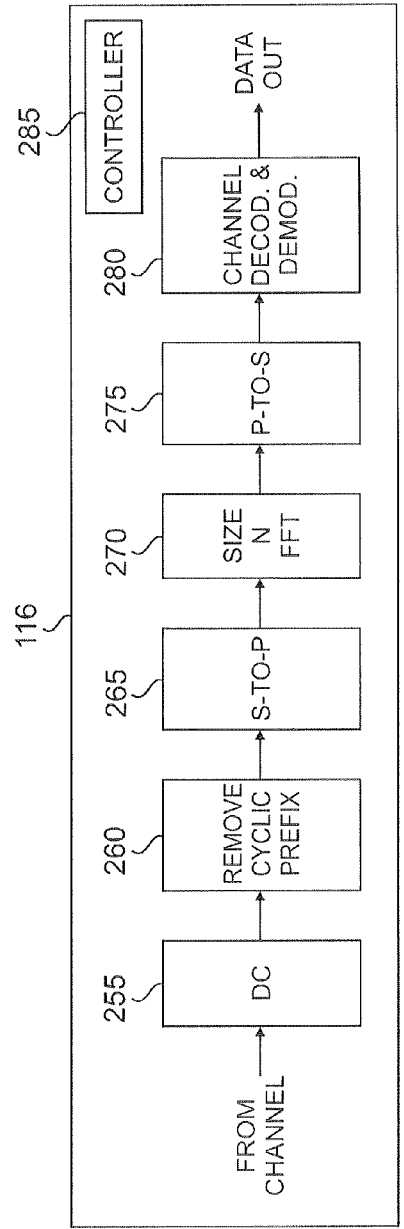
FIG. 2B is a high-level diagram of an orthogonal frequency division multiple access (OFDMA) receive path.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in mobile station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

FIG. 2A also shows controller 235, and FIG. 2B also shows controller 285. Controller 235 and 285 may be configured to control the various elements of FIGS. 2A and 2B, as well as configured to carry out other instructions consistent with this disclosure. Controller 235 and 285 may be implemented as a controller, a controller with a memory, or any other component capable of performing the functions of a controller.

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to mobile stations 111-116 and may implement a receive path that is analogous to receiving in the uplink from mobile stations 111-116. Similarly, each one of mobile stations 111-116 may implement a transmit path corresponding to the architecture for transmitting in the uplink to base stations 101-103 and may implement a receive path corresponding to the architecture for receiving in the downlink from base stations 101-103.

Throughout this disclosure the phrases "mobile device", "wireless device", and "user equipment" are used. These terms are intended to encompass any device capable of transmitting and receiving wireless signals, and should not be construed as limited to either a "mobile" device or a device that is used by a "user". These terms should be construed to include any device capable of transmitting or receiving data using DCI formats, including DCI formats 1a and 2.

A plurality of transmission modes is contemplated that corresponds to a plurality of reference DCI formats. One problem with existing systems is that mobile devices are generally able to interpret and understand only a single DCI format. For example, a mobile device configured to use reference DCI format 2 would have difficulty communicating with a using DCI format 1A. In order to overcome this problem, this disclosure presents innovative systems and methods that allow for an additional bit to be added to DCI format 1A that provides information to another wireless device, such as a mobile device, that relates to the type of format being used. This additional information may be used when the mobile device is configured in either an open or closed loop spatial multiplexing transmission mode, and may be used to promote communications with an enhanced Node-B (eNB).

Figure 3:
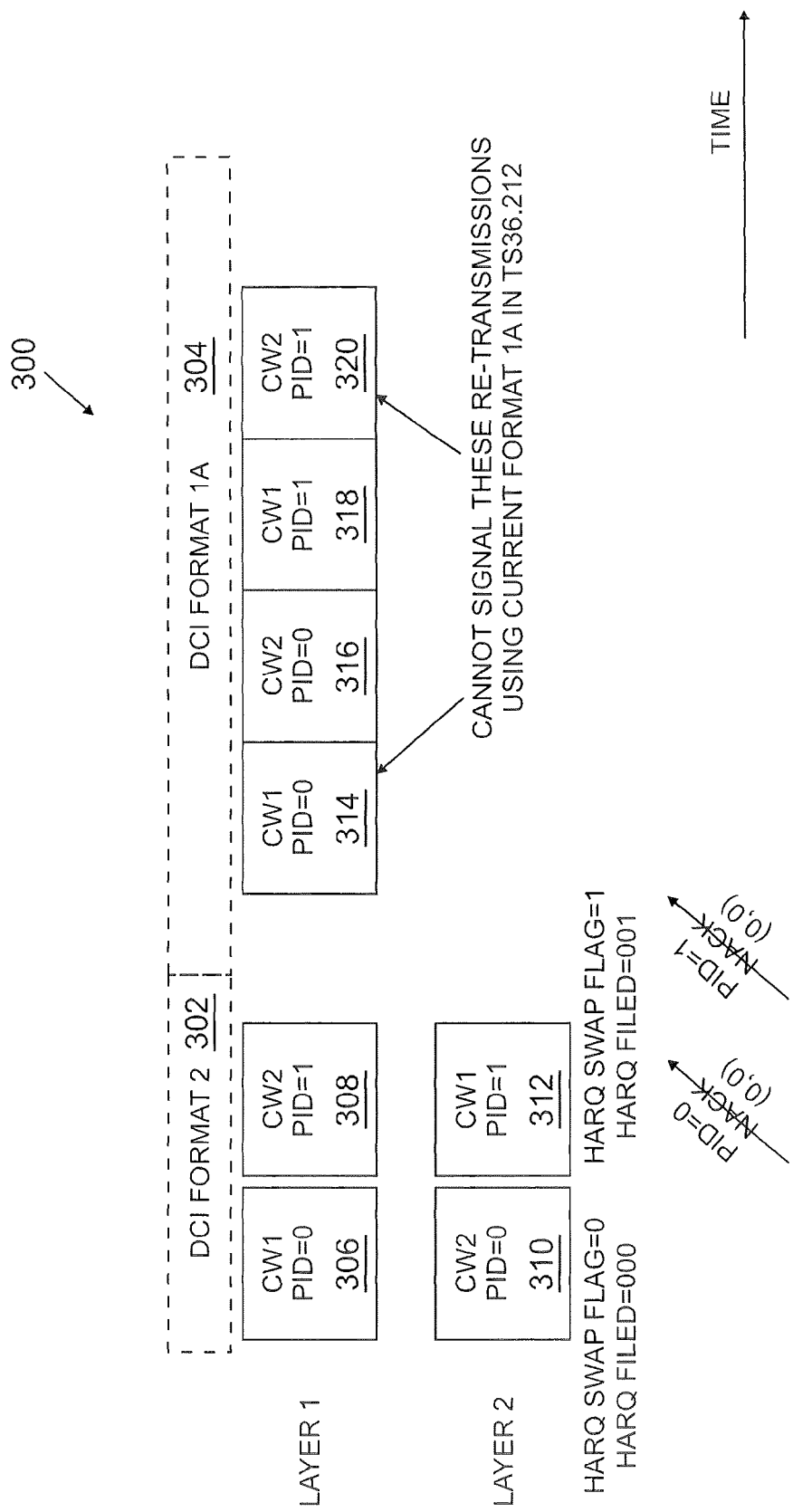
FIG. 3 illustrates dynamic switching between DCI formats according to an exemplary embodiment of the disclosure.

FIG. 3 shows one embodiment of a 2-transmission (2TX) system 300 utilizing dynamic switching between DCI format 1A 302 and DCI format 2 304. In layer 1, CW1 PID=0 306 and CW2 PID=1 308 are shown in DCI format 2 302. Also in layer 1, CW1 PID=0 314, CW2 PID=0 316, CW1 PID=1 318, and CW2 PID=1 320 are shown in DCI format 1A 304. Layer 2 also shows CW2 PID=0 310 and CW1 PID=1 312 in DCI format 2 302.

The eNB may dynamically switch either from DCI format 2 to DCI format 1A, or from format 1A to format 2. It is possible to support 2 codewords (CW) (e.g., CW2 PID=0 310 and CW1 PID=1 312) in one subframe when eNB is using DCI format 2 as the downlink control format. If the mobile device reports a negative acknowledgement signal (NACK) on both CWs and if at the same time the eNB switches from format 2 to format 1A, then the format 1A should be able to identify these two CWs in re-transmission using CW2 PID=0 316 and CW1 PID=1 318, as shown in FIG. 3.

For example, in a 2-TX system 2 CWs can be mapped to 2 layers. It is understood that the Hybrid Automatic Repeat ReQuest (HARQ) process ID (PID) has three bits in format 2 for frequency-division duplex (FDD), and the value of PID ranges from PID=0 to PID=7. In DCI format 2, it is possible for the mapping of two codewords to the two layers to be different, using the "HARQ swap bit" in DCI format 2. For example, as shown in FIG. 3 for PID=0, the HARQ swap bit=0, and CW 1 is mapped to layer 1 while CW 2 is mapped to layer 2; for PID=1, the HARQ swap bit=1, and CW1 is mapped to layer 2 while CW 2 is mapped to layer 1.

However, currently for DCI format 1A, there are only 3 HARQ bits, and therefore, it is not possible for an eNB to use DCI format 1A to properly indicate the CW number in the HARQ retransmission if the transmission uses DCI format 2. This limitation can be overcome through the disclosed systems and methods of this application.

DCI format 1A is used for a compact transmission of download shared channel (DL-SCH) assignments for single input, multiple output (SIMO) operation. The information in Table 2 may transmit using DCI format 1A. This is not intended to be an exhaustive list of information, and is intended to exemplary purposes.

TABLE 2

Information transmitted using Format 1A

| Name of Information | Bits of Information |
| --- | --- |
| Flag for format 0/format 1A differentiation | 1 |
| Distributed transmission flag | 1 |
| Resource block assignment | 5 |
| Modulation and coding scheme | |
| HARQ process number | 3 bits (FDD), 4 bits (TDD) |
| New data indicator | 1 |
| Redundancy version | 2 |
| TPC command for PUCCH | 2 |

DCI format 2 is used for the transmission of DL-SCH assignments for MIMO operation. The information in Table 3 may transmit using DCI format 2. This is not intended to be an exhaustive list of information, and is intended to exemplary purposes.

TABLE 3

Information transmitted using Format 2

| Name of Information | Bits of Information |
|---|---|
| Resource allocation header (resource allocation type 0/type 1) | 1 |
| For resource allocation | Type 0: $\lceil N_{RB}^{DL}/P \rceil$ |
| | Type 1: $\lceil \log_2(P) \rceil$ $(\lceil N_{RB}^{DL}/P \rceil - \lceil \log_2(P) \rceil - 1)$ |
| Resource allocation (One addition bit may be used to show presence of shift) | |
| TPC command for PUCCH | 2 |
| HARQ process number | 3 bits (FDD), 4 bits (TDD) |
| HARQ swap flag | 1 |
| CW 1: Modulation and coding scheme | 5 |
| CW 1: New data indicator | 1 |
| CW 1: Redundancy version | 2 |
| CW 2: Modulation and coding scheme | 3 |
| CW 2: New data indicator | 1 |
| CW 2: Redundancy version | 2 |

In addition, the current MCS table for long-term evolution (LTE) systems is shown below in Table 4. The mobile device may use $I_{MCS}$ and Table 4 to determine the modulation order ($Q_m$) used in the physical downlink shared channel.

TABLE 4

Modulation and TBS index table for PDSCH.

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

In one embodiment of the disclosure, an additional field is inserted into the DCI format 1A with size of 1 bit which can be referred to as either a CW indicator Flag (CWF) or a HARQ swap flag. This may be applicable if format 1A is used by an eNB to communicate to a mobile device that is currently configured in either open-loop or closed-loop spatial multiplexing transmission modes and configured to use reference DCI format 2.

Table 5 illustrates one method of setting the control signaling for the proposed format 1A to properly indicate the PIDs and CWs.

TABLE 5

Mapping HARQ field and CW indicator flag to HARQ process ID and CW ID. FDD assumed.

| HARQ field (3 bits) | CW indicator flag (1 bit) | HARQ process ID and CW ID |
|---|---|---|
| 000 | 0 | PID = 0, CW1 |
| 001 | 0 | PID = 1, CW1 |
| 010 | 0 | PID = 2, CW1 |
| 011 | 0 | PID = 3, CW1 |
| 100 | 0 | PID = 4, CW1 |
| 101 | 0 | PID = 5, CW1 |
| 110 | 0 | PID = 6, CW1 |
| 111 | 0 | PID = 7, CW1 |
| 000 | 1 | PID = 0, CW2 |
| 001 | 1 | PID = 1, CW2 |
| 010 | 1 | PID = 2, CW2 |
| 011 | 1 | PID = 3, CW2 |
| 100 | 1 | PID = 4, CW2 |
| 101 | 1 | PID = 5, CW2 |
| 110 | 1 | PID = 6, CW2 |
| 111 | 1 | PID = 7, CW2 |

Figure 4:
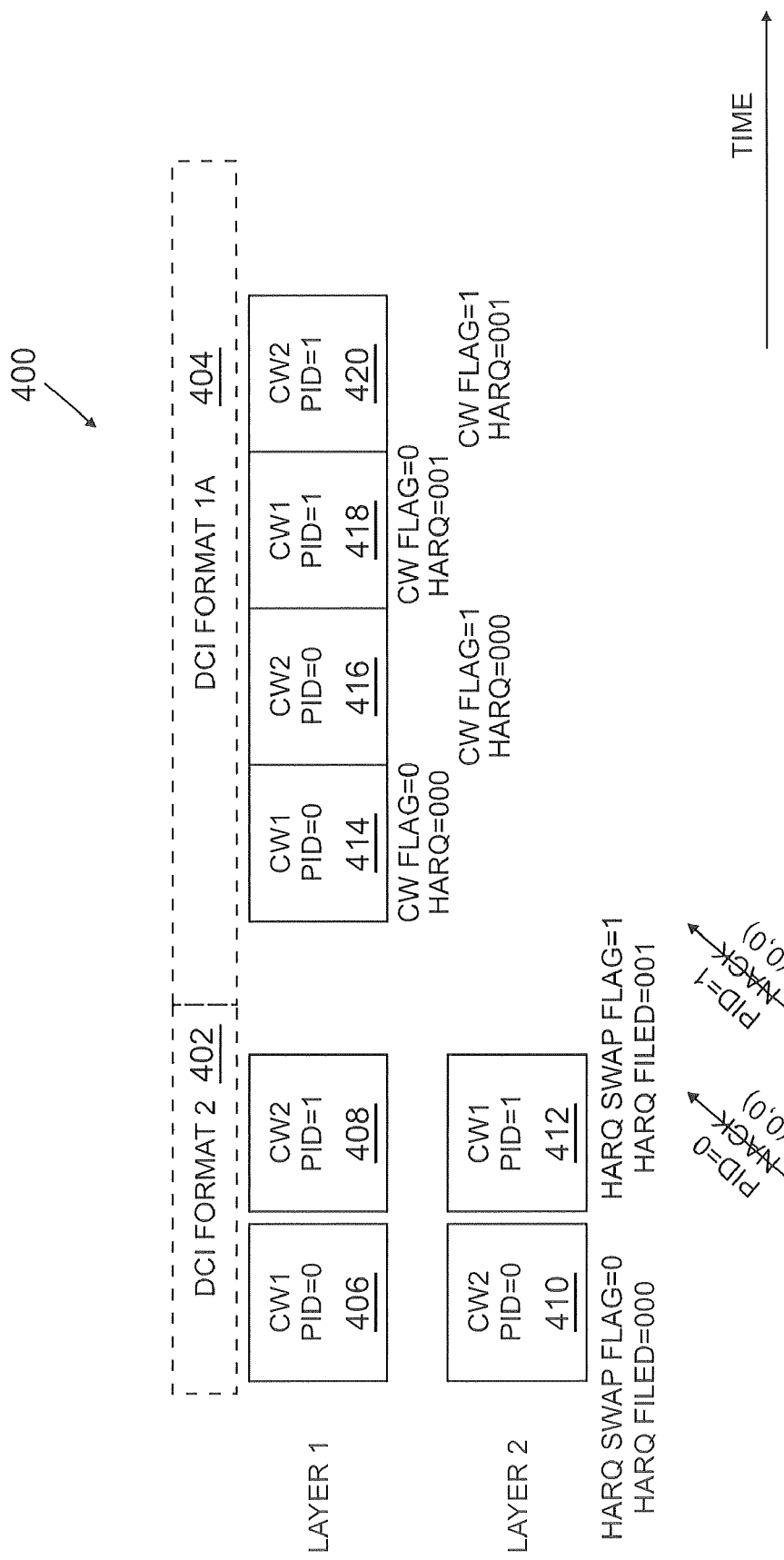
FIG. 4 illustrates the signaling of process identification (PID) and CodeWord (CW) number with an additional CW indicator according to an exemplary embodiment of the disclosure.

Using the additional CW Flag bit and the mapping in the above table, it is possible to resolve the signaling issue identified in the example of FIG. 3. FIG. 4 shows how this additional bit/field is used to indicate the combinations of PID and CW numbers, when the eNB switches from DCI format 2 to DCI format 1A.

FIG. 4 illustrates a signaling 400 of PID and CW numbers with the additional CW indicator flag and HARQ field in format 1A. FIG. 4 shows DCI format 2 402 and DCI format 1A 404. In layer 1, CW1 PID=0 406 and CW2 PID=1 408 are shown in DCI format 2 402. Also in layer 1, CW1 PID=0 414, CW2 PID=0 416, and CW1 PID=1 418, and CW2 PID=1 420 are shown in DCI format 1A 404. Layer 2 has CW2 PID=0 410 and CW1 PID=1 412 DCI format 2 402.

Adding an addition flag is useful in some methods, but it is understood that it is also possible to extend the existing HARQ field in DCI format 1A to achieve the same purpose. In this embodiment, the new extended HARQ field will have 4 bits for FDD and 5 bits for time division duplex (TDD). In Table 6 below, the mapping between the new HARQ field and the HARQ process ID as well as CW ID is shown.

TABLE 6

Mapping extended HARQ field to HARQ process ID and CW ID. FDD assumed.

| Extended HARQ field (4 bits) | HARQ process ID and CW ID |
|---|---|
| 0000 | PID = 0, CW1 |
| 0001 | PID = 1, CW1 |
| 0010 | PID = 2, CW1 |
| 0011 | PID = 3, CW1 |
| 0100 | PID = 4, CW1 |
| 0101 | PID = 5, CW1 |
| 0110 | PID = 6, CW1 |
| 0111 | PID = 7, CW1 |
| 1000 | PID = 0, CW2 |
| 1001 | PID = 1, CW2 |
| 1010 | PID = 2, CW2 |
| 1011 | PID = 3, CW2 |
| 1100 | PID = 4, CW2 |

TABLE 6-continued

Mapping extended HARQ field to HARQ process ID and CW ID. FDD assumed.

| Extended HARQ field (4 bits) | HARQ process ID and CW ID |
|---|---|
| 1101 | PID = 5, CW2 |
| 1110 | PID = 6, CW2 |
| 1111 | PID = 7, CW2 |

In yet another embodiment, a combination of the existing HARQ field in format 1A with different CRC masks to indicate the HARQ process ID as well as the choice of CW1 or CW2 may be used. This embodiment may be particularly advantageous when DCI format 1A is used by an eNB to communicate with a mobile device that is currently configured in either open-loop or closed-loop spatial multiplexing transmission modes and configured to use reference DCI format 2.

In some embodiments, error detection is provided on DCI transmissions through a Cyclic Redundancy Check (CRC). The entire PDCCH payload is used to calculate the CRC parity bits. The bits of the PDCCH payload are denoted by: $a_0$, $a_1, a_2, a_3, \ldots, a_{A-1}$, and the parity bits are denoted by: $p_0, p_1, p_2, p_3, \ldots, p_{L-1}$. A is the PDCCH payload size, and L is the number of parity bits.

The parity bits are computed and attached according to subclause 5.1.1 of 3GPP TS 36.212, v 8.2.0, March 2008. Setting L to 16 bits results in the sequence $b_0, b_1, b_2, b_3, \ldots, b_{B-1}$, where B=A+L.

Other than the case for format 1A being used for a mobile device configured in open-loop or closed-loop spatial multiplexing mode, after attachment, the CRC parity bits are scrambled with the mobile device identity $x_{ue,0}, x_{ue,1}, \ldots, x_{ue,15}$ to form the sequence of bits $c_0, c_1, c_2, c_3, \ldots, c_{B-1}$. The relation between $c_k$ and $b_k$ is:

$c_k = b_k$, for k=0, 1, 2, ..., A−1, and $c_k = (b_k + x_{ue,k-A}) \bmod 2$, for k=A, A+1, A+2, ..., A+15.

Table 6 illustrates one codeword selection mask for use by CW1 and CW2. This mask is intended to be exemplary only, as any mask may be used so long as the mask is understood by both the sender and receiver of the CW.

TABLE 6

| Codeword Selection | Codeword selection mask $x_{CW,0}, x_{CW,1}, \ldots, x_{CW,15}$ |
|---|---|
| CW1 | mask 1: <0, 0, 0, 0, 0, 0, 0, 0, 0, 0, 0, 0, 0, 0, 0, 0> |
| CW2 | mask 2: <0, 0, 0, 0, 0, 0, 0, 0, 0, 0, 0, 0, 0, 0, 0, 1> |

Table 7 illustrates how the control signaling should be set in the proposed format 1A to properly indicate the PIDs and CWs, using the combination of HARQ field and CW selection CRC mask.

TABLE 7

Mapping HARQ field and CW selection CRC Mask to HARQ process ID and CW ID. FDD assumed.

| HARQ field (3 bits) | CW selection CRC mask | HARQ process ID and CW ID |
|---|---|---|
| 000 | mask 1 | PID = 0, CW1 |
| 001 | mask 1 | PID = 1, CW1 |
| 010 | mask 1 | PID = 2, CW1 |
| 011 | mask 1 | PID = 3, CW1 |
| 100 | mask 1 | PID = 4, CW1 |
| 101 | mask 1 | PID = 5, CW1 |
| 110 | mask 1 | PID = 6, CW1 |
| 111 | mask 1 | PID = 7, CW1 |
| 000 | mask 2 | PID = 0, CW2 |
| 001 | mask 2 | PID = 1, CW2 |
| 010 | mask 2 | PID = 2, CW2 |
| 011 | mask 2 | PID = 3, CW2 |
| 100 | mask 2 | PID = 4, CW2 |
| 101 | mask 2 | PID = 5, CW2 |
| 110 | mask 2 | PID = 6, CW2 |
| 111 | mask 2 | PID = 7, CW2 |

Figure 5:
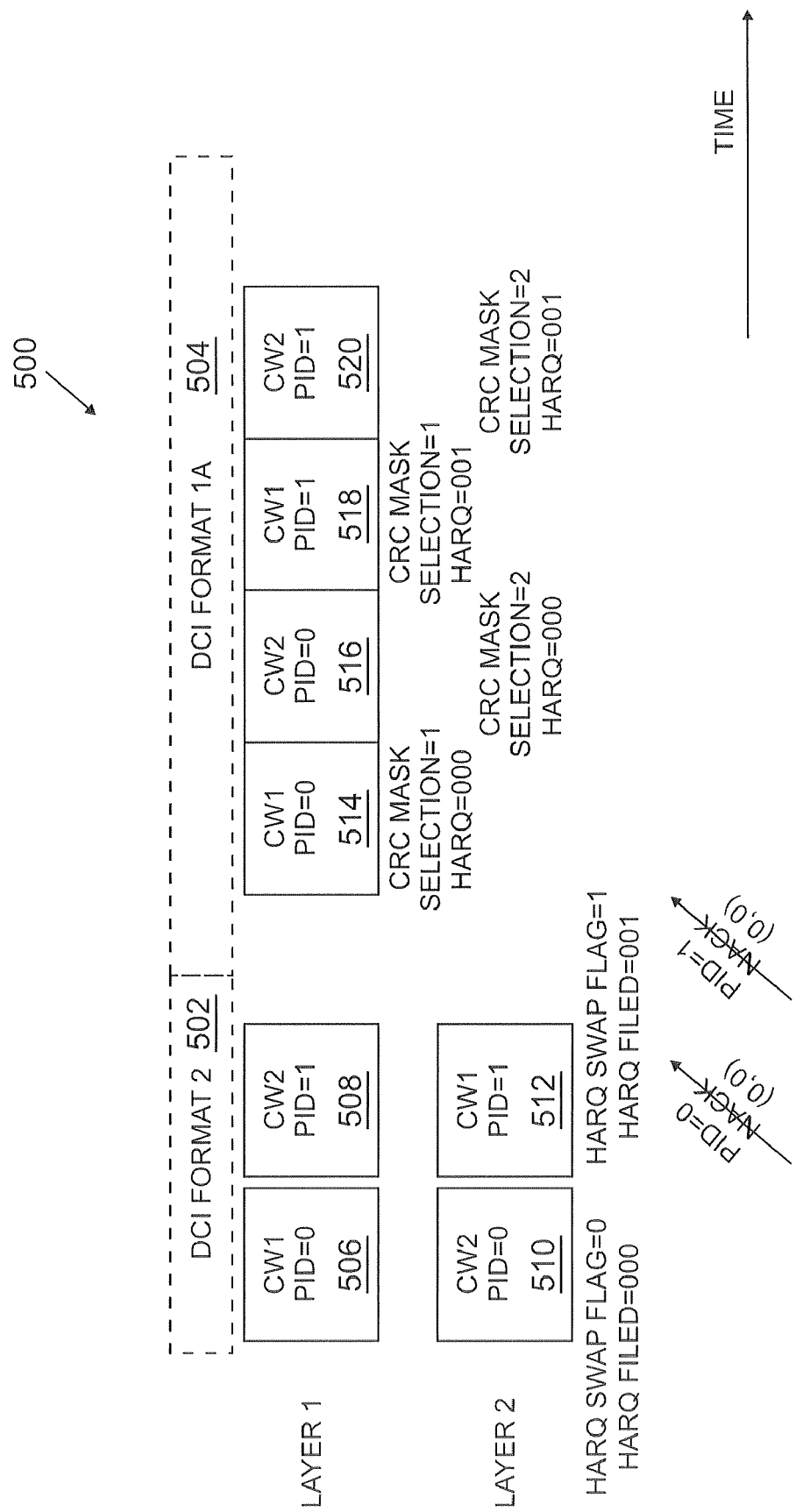
FIG. 5 illustrates the signaling of PID and CW number with the additional cyclic redundancy check (CRC) mask selection according to an exemplary embodiment of the disclosure.

Using this CRC mask to CW number mapping in the above table 7, FIG. 5 illustrates an example 500 of how this additional CRC masking selection is used to indicate the combinations of PID and CW numbers when an eNB switches from format 2 to format 1A.

FIG. 5 shows DCI format 2 502 and DCI format 1A 504. In layer 1, CW1 PID=0 506 and CW2 PID=1 508 are shown in DCI format 2 502. Also in layer 1, CW1 PID=0 514, CW2 PID=0 516, CW1 PID=1 518, and CW2 PID=1 520 are shown in DCI format 1A 504. Layer 2 has CW2 PID=0 510 and CW1 PID=1 512 in DCI format 2 502.

In another embodiment of the disclosure, the combination of an existing HARQ field in format 1A and a restriction on subframe number to indicate the HARQ process ID as well as the choice of CW1 or CW2 is shown. This embodiment may be used when format 1A is used by an eNB to communicate with a mobile device that is currently configured in either open-loop or closed-loop spatial multiplexing transmission modes and configured to use reference DCI format 2. Here the restriction on subframe number means that one subset of subframe numbers is used to indicate CW1, while the other subset of subframe numbers is used to indicate CW2.

One example of indicating CW choice by restriction on subframe number is referred to as Method A:

Step 1—If $\bmod(N_{sub}, 2) = 0$ (i.e., if subframe number is even), then CW 1 is indicated.

Step 2—If $\bmod(N_{sub}, 2) = 1$ (i.e., if subframe number is odd), then CW 2 is indicated.

Another example of indicating CW choice by restriction on subframe number is referred to as Method B:

Step 1—If $\bmod(N_{sub}, 2) = 0$ (i.e., if subframe number is even), then CW 2 is indicated.

Step 2—If $\bmod(N_{sub}, 2) = 1$ (i.e., if subframe number is odd), then CW 1 is indicated.

Table 8 below is an illustration of how control signaling should be set for in the proposed format 1A to properly indicate the PIDs and CWs using the combination of HARQ field and subframe number restriction.

TABLE 8

Mapping HARQ field and subframe number to HARQ process ID and CW ID. FDD and method A assumed.

| HARQ Field (3 bits) | Subframe Number | HARQ Process ID & CW ID |
|---|---|---|
| 000 | even | PID = 0, CW1 |
| 001 | even | PID = 1, CW1 |
| 010 | even | PID = 2, CW1 |
| 011 | even | PID = 3, CW1 |
| 100 | even | PID = 4, CW1 |
| 101 | even | PID = 5, CW1 |
| 110 | even | PID = 6, CW1 |
| 111 | even | PID = 7, CW1 |
| 000 | odd | PID = 0, CW2 |
| 001 | odd | PID = 1, CW2 |
| 010 | odd | PID = 2, CW2 |
| 011 | odd | PID = 3, CW2 |
| 100 | odd | PID = 4, CW2 |
| 101 | odd | PID = 5, CW2 |
| 110 | odd | PID = 6, CW2 |
| 111 | odd | PID = 7, CW2 |

Figure 6:
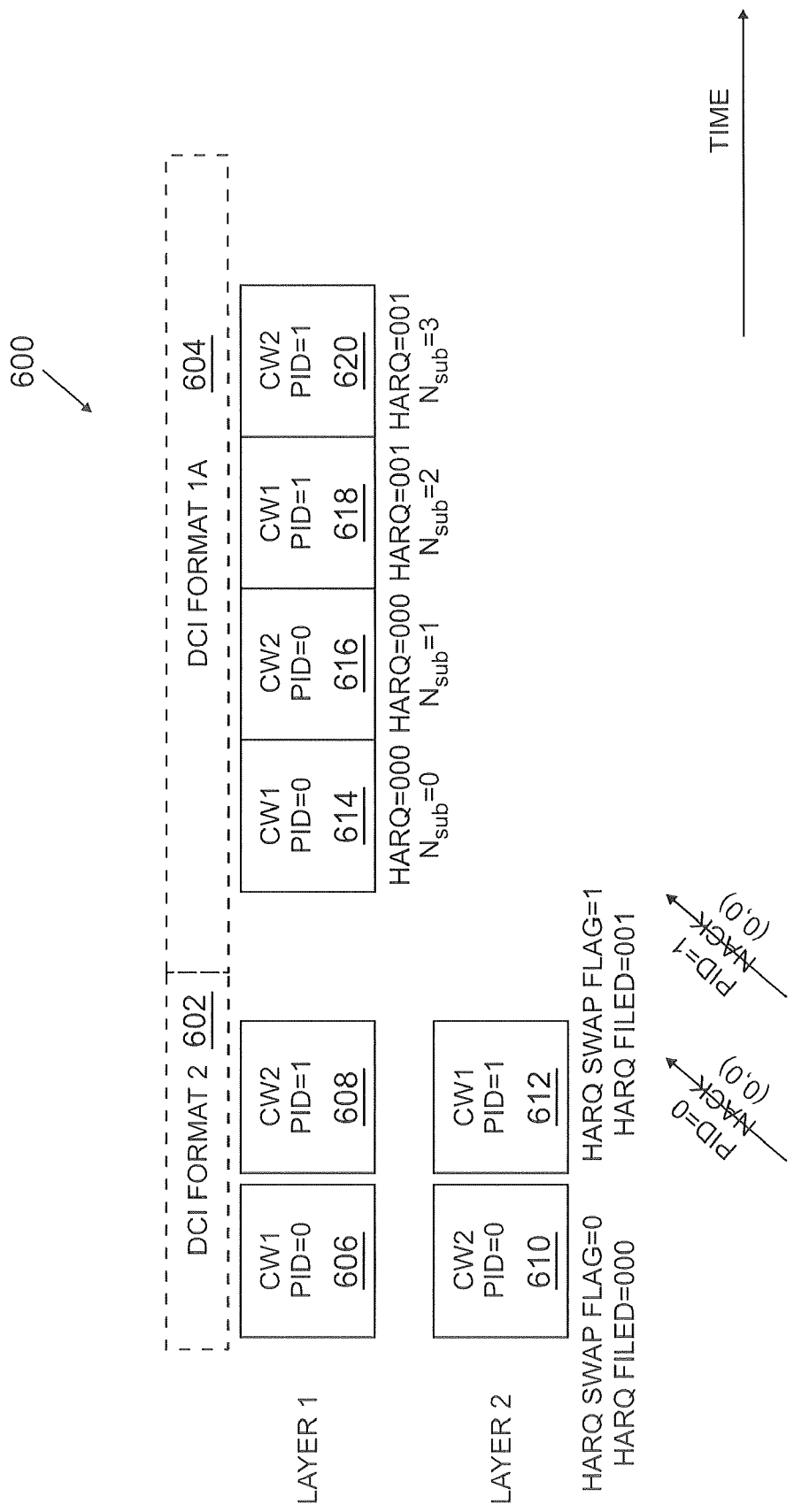
FIG. 6 illustrates the signaling of PID and CW number with a subframe number and Hybrid Automatic Repeat ReQuest (HARQ) according to an exemplary embodiment of the disclosure.

Using this subframe number to CW number mapping in the above table, FIG. 6 shows an example of how the HARQ field and subframe number restriction are used to indicate the combinations of PID and CW numbers when an eNB switches from format 2 to format 1A.

FIG. 6 shows a signaling 600 of PID and CW numbers with the subframe number and HARQ field in format 1A. FIG. 6 shows DCI format 2 602 and DCI format 1A 604. In layer 1, CW1 PID=0 606 and CW2 PID=1 608 are shown in DCI format 2 602. Also in layer 1, CW1 PID=0 614, CW2 PID=0 616, CW1 PID=1 618, and CW2 PID=1 620 are shown in DCI format 1A 604. Layer 2 has CW2 PID=0 610 and CW1 PID=1 612 in DCI format 2 602.

In another embodiment of the disclosure, the combination of existing HARQ field in format 1A and a restriction on the first Resource Block (RB) index or the first RB group (RBG) index, in order to indicate the HARQ process ID as well as the choice of CW1 or CW2, if format 1A is used by eNB to communicate with a mobile device that is currently configured in either open-loop or closed-loop spatial multiplexing transmission modes and configured to use reference DCI format 2. In this embodiment, each RBG can contain several RBs.

One example of indicating CW choice by restriction on the first RB (or RBG) index $N_{RB}$ is referred to as Method C and shown below:

Step 1—If mod($N_{RB}$,2)=0 (i.e., if first RB or RBG index is even), then CW 1 is indicated.

Step 2—If mod($N_{RB}$,2)=1 (i.e., if first RB or RBG index is odd), then CW 2 is indicated.

Another example of indicating CW choice by restriction on the first RB (or RBG) index $N_{RB}$ is referred to as Method D and shown below:

Step 1—If mod($N_{RB}$,2)=0 (i.e., if first RB or RBG index is even), then CW 2 is indicated.

Step 2—If mod($N_{sub}$,2)=1 (i.e., if first RB or RBG index is odd), then CW 1 is indicated.

In another embodiment of the disclosure, the use of a NDI (new data indicator) and MCS (modulation and coding scheme) fields in format 1A to jointly indicate the choice of CW1 or CW2, if format 1A is used by an eNB to communicate with a mobile device that is currently configured in either open-loop or closed-loop spatial multiplexing transmission modes and configured to use reference DCI format 2. The HARQ process number is still conveyed by the existing HARQ field in format 1A.

One example of this joint indication is given by a subset of up to three MCS entries to indicate CW1 retransmission with QPSK, 16QAM and 64QAM, and the other subset of up to three MCS entries to indicate CW2 retransmission with QPSK, 16QAM and 64QAM. Meanwhile, all other MCSs are set as "reserved" in the case of NDI=0. For example, in Table 9 below, an example where MCS=29, 30, 31 is used to indicate CW1 retransmission with QPSK, 16QAM and 64QAM, respectively, is shown. In addition, Table 9 also shows where MCS=26, 27, 28 is used to indicate CW2 retransmission with QPSK, 16QAM and 64QAM, respectively.

TABLE 9

Indication of CW number by joint NDI and MCS signaling. NDI = 0.

| MCS level | CW number and Modulation |
|---|---|
| 26 | CW2, QPSK retransmission |
| 27 | CW2, 16QAM retransmission |
| 28 | CW2, 64QAM retransmission |
| 29 | CW1, QPSK retransmission |
| 30 | CW1, 16QAM retransmission |
| 31 | CW1, 64QAM retransmission |
| other | reserved |

It is also understood that when ND1=1 (initial transmission), one subset of MCS entries can be used to indicate CW1, and the other subset of MCS entries can be used to indicate CW2. For example, in Table 10 below, an example is shown where even MCS values are used to indicate CW1 initial transmission and odd MCS values are used to indicate CW2 initial transmission.

TABLE 10

Indication of CW number by joint NDI and MCS signaling. NDI = 1.

| MCS Index $I_{MCS}$ | CW number | Modulation Order $Q_m$ | TBS Index $I_{TBS}$ |
|---|---|---|---|
| 0 | CW1 | 2 | 0 |
| 1 | CW2 | 2 | 1 |
| 2 | CW1 | 2 | 2 |
| 3 | CW2 | 2 | 3 |
| 4 | CW1 | 2 | 4 |
| 5 | CW2 | 2 | 5 |
| 6 | CW1 | 2 | 6 |
| 7 | CW2 | 2 | 7 |
| 8 | CW1 | 2 | 8 |
| 9 | CW2 | 2 | 9 |
| 10 | CW1 | 4 | 9 |
| 11 | CW2 | 4 | 10 |
| 12 | CW1 | 4 | 11 |
| 13 | CW2 | 4 | 12 |
| 14 | CW1 | 4 | 13 |
| 15 | CW2 | 4 | 14 |
| 16 | CW1 | 4 | 15 |
| 17 | CW2 | 6 | 15 |
| 18 | CW1 | 6 | 16 |
| 19 | CW2 | 6 | 17 |
| 20 | CW1 | 6 | 18 |
| 21 | CW2 | 6 | 19 |
| 22 | CW1 | 6 | 20 |
| 23 | CW2 | 6 | 21 |
| 24 | CW1 | 6 | 22 |
| 25 | CW2 | 6 | 23 |
| 26 | CW1 | 6 | 24 |
| 27 | CW2 | 6 | 25 |
| 28 | CW1 | 6 | 26 |
| 29 | reserved | 2 | reserved |
| 30 | reserved | 4 | reserved |
| 31 | reserved | 6 | reserved |

In another embodiment, a restriction on the RV field in format 1A to indicate the choice of CW1 or CW2 may be used when the eNB communicates with a mobile device that is currently configured in either open-loop or closed-loop spatial multiplexing transmission modes and configured to use reference DCI format 2. That is, one subset of RV values indicates CW1 while the other subset of RV values indicates CW2. The HARQ process number is still conveyed by the existing HARQ field in format 1A.

One example of such an RV subset restriction is that (RV values belong to the overall set {0, 1, 2, 3}): 1) if RV=0 or RV=2, then CW1 is indicated; and 2) if RV=1 or RV=3, then CW2 is indicated.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. In an wireless communication system, a method of providing information from a base station to a mobile device than enables the mobile device to use at least one downlink control information (DCI) format, the method comprising:
　receiving, using a first DCI format, data over a wireless communication channel, wherein the received data comprises identification information that identifies a codeword index and hybrid automatic repeat request process ID (PID), the first DCI format selected from one of a DCI format 1A and a DCI format 2;
　identifying the codeword index and PID using a second DCI format based on the received data, the second DCI format selected from the other of the DCI format 1A and the DCI format 2; and
　processing the codeword index and PID using the second DCI format.

2. The method of claim 1, wherein the identification is provided through a cyclic redundancy check (CRC) mask.

3. The method of claim 1, wherein the identification is provided through an addition data flag comprised within the transmitted data.

4. The method of claim 1, wherein the identification is provided through an addition bit added to the hybrid automatic repeat request.

5. The method of claim 1, wherein the mobile device is a user equipment device.

6. The method of claim 1, wherein the identification information is provided through the location of the resource used to transmit at least one codeword.

7. The method of claim 1, wherein the information is provided through a modulation scheme.

8. The method of claim 6, wherein the location of the code word is in a time domain or a frequency domain.

9. A wireless communication system, wherein the system comprises:
　a mobile station configured to communicate with at least one of a plurality of base stations, the mobile station comprising:
　　a receiver configured to receive, using a first downlink control information (DCI) format, wireless information through a wireless communication channel, the first DCI format selected from one of a DCI format 1A and a DCI format 2;
　　a processor configured to obtain the wireless information from the receiver and interpret the wireless data format using identification information comprised within the wireless information, wherein the identification information comprises a codeword index and hybrid automatic repeat request process ID (PID) adapted for use in a second DCI format, the second DCI format selected from the other of the DCI format 1A and the DCI format 2.

10. The wireless communication system of claim 9, wherein the identification is provided through a cyclic redundancy check (CRC) mask.

11. The wireless communication system of claim 9, wherein the identification is provided through an addition data flag comprised within the transmitted data.

12. The wireless communication system of claim 9, wherein the identification is provided through an addition bit added to the hybrid automatic repeat request.

13. The wireless communication system of claim 9, wherein the system is embedded into a mobile device.

14. The wireless communication system of claim 9, wherein the wireless information is transmitted by an eNodeB.

15. The wireless communication system of claim 9, wherein the wireless information is provided through a modulation scheme.

16. The wireless communication of claim 12, wherein further identification information is provided through the location of the resource used to transmit at least one codeword.

17. A method for allowing a mobile device configured to communication using downlink control information (DCI) format 2 to communication with a base station configured to communication using DCI format 1A, the method comprising:
　selecting data to be transmitted from the base station to the mobile device;
　embedding information into the data that indicates the type of format to be used by the mobile device, the information comprising a codeword index and hybrid automatic repeat request process ID (PID);
　transmitting the data to the mobile device using at least one of the DCI format 2 and the DCI format 1A; and
　retransmitting the data to the mobile device using the other of the DCI format 2 and the DCI format 1A.

18. The method of claim 17, wherein the information is provided through a cyclic redundancy check (CRC) mask.

19. The method of claim 17, wherein the information is provided through an addition data flag comprised within the transmitted data.

20. The method of claim 17, wherein the information is provided through an addition bit added to the hybrid automatic repeat request.

* * * * *